United States Patent
Lane et al.

(10) Patent No.: US 10,044,381 B2
(45) Date of Patent: Aug. 7, 2018

(54) WIRELESS DEVICE WITH FILTERS TO SUPPORT CO-EXISTENCE IN ADJACENT FREQUENCY BANDS

(75) Inventors: Mark Vernon Lane, San Diego, CA (US); Chang-Ho Lee, San Diego, CA (US); Christian Holenstein, La Mesa, CA (US); Mahim Ranjan, San Diego, CA (US); Praveen-Kumar Sampath, San Diego, CA (US); Frederic Bossu, San Diego, CA (US); Sumit Verma, San Diego, CA (US); Wesley Alan Sampson, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/584,273

(22) Filed: Aug. 13, 2012

(65) Prior Publication Data

US 2013/0225107 A1    Aug. 29, 2013

Related U.S. Application Data

(60) Provisional application No. 61/602,401, filed on Feb. 23, 2012.

(51) Int. Cl.
*H04B 1/04* (2006.01)
(52) U.S. Cl.
CPC ............ *H04B 1/0458* (2013.01); *H04B 1/04* (2013.01); *H04B 1/0475* (2013.01)
(58) Field of Classification Search
CPC ....... H04B 1/04; H04B 1/0458; H04B 1/0475
(Continued)

(56) References Cited

U.S. PATENT DOCUMENTS 6,326,860 B1 * 12/2001 Kobayashi ................ 332/159
6,766,150 B1 *  7/2004 Johnson .................... 455/87
(Continued)

FOREIGN PATENT DOCUMENTS

EP      2178219 A1    4/2010
JP   2000324184 A    11/2000
(Continued)

OTHER PUBLICATIONS

International Search Report and Written Opinion—PCT/US2013/027470—ISA/EPO—dated May 17, 2013.

*Primary Examiner* — Raymond Dean
(74) *Attorney, Agent, or Firm* — Patterson & Sheridan, L.L.P

(57) ABSTRACT

Techniques for using a narrow filter located before a power amplifier to reduce interference in an adjacent frequency band are disclosed. In an exemplary design, an apparatus (e.g., a wireless device) includes the narrow filter and the power amplifier. The narrow filter is for a first frequency band (e.g., Band 40) and has a first bandwidth that is more narrow than the first frequency band. The narrow filter receives and filters an input radio frequency (RF) signal and provides a filtered RF signal. The power amplifier receives and amplifies the filtered RF signal and provides an amplified RF signal. The apparatus may further include a full filter for the first frequency band and located after the power amplifier. The full filter receives and filters the amplified RF signal and provides an output RF signal when it is selected for use.

21 Claims, 7 Drawing Sheets

(58) Field of Classification Search
USPC ...... 455/234.1, 233.1, 231, 230, 108, 127.1, 455/127.2, 114.3
See application file for complete search history.

(56) References Cited

U.S. PATENT DOCUMENTS

| | | |
|---|---|---|
| 7,206,557 B2 * | 4/2007 | Aytur et al. ................... 455/118 |
| 7,231,189 B2 | 6/2007 | Rowe et al. |
| 7,292,830 B1 * | 11/2007 | Cheung ................ H04B 17/345 375/345 |
| 7,653,163 B2 | 1/2010 | Sadri et al. |
| 7,676,243 B2 * | 3/2010 | Leinonen et al. ......... 455/550.1 |
| 7,760,023 B2 * | 7/2010 | Bockelman ........... H01L 23/645 330/124 R |
| 8,064,555 B1 | 11/2011 | Rockway et al. |
| 2003/0143960 A1 * | 7/2003 | Yamawaki et al. ............. 455/86 |
| 2010/0261435 A1 | 10/2010 | Behzad et al. |
| 2010/0291888 A1 | 11/2010 | Hadjichristos et al. |
| 2011/0116490 A1 | 5/2011 | Wilhelmsson et al. |
| 2011/0261727 A1 | 10/2011 | Han |
| 2012/0009886 A1 | 1/2012 | Poulin |
| 2012/0009889 A1 | 1/2012 | Morgan et al. |
| 2012/0034913 A1 | 2/2012 | Wang et al. |

FOREIGN PATENT DOCUMENTS

| | | |
|---|---|---|
| JP | 2004222171 A | 8/2004 |
| JP | 2010136298 A | 6/2010 |

* cited by examiner

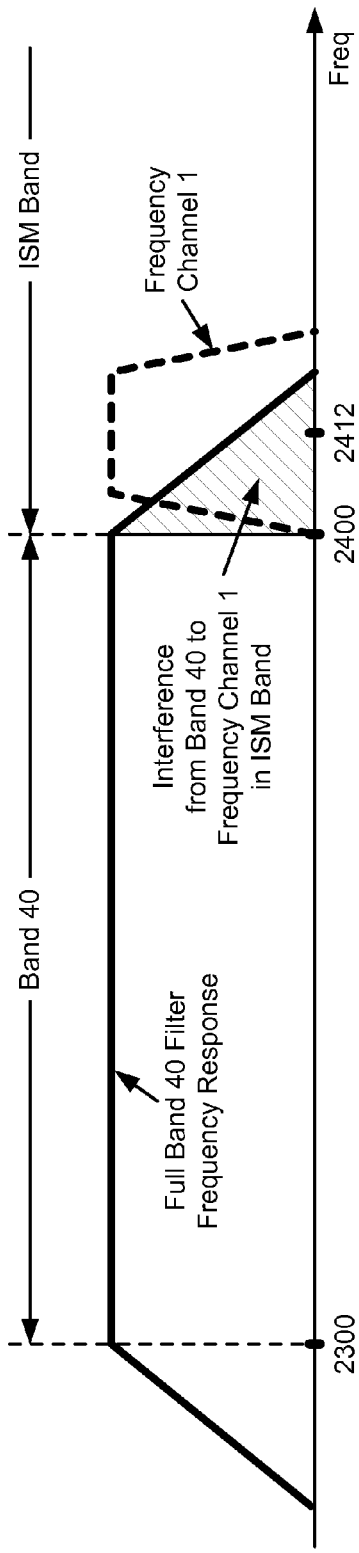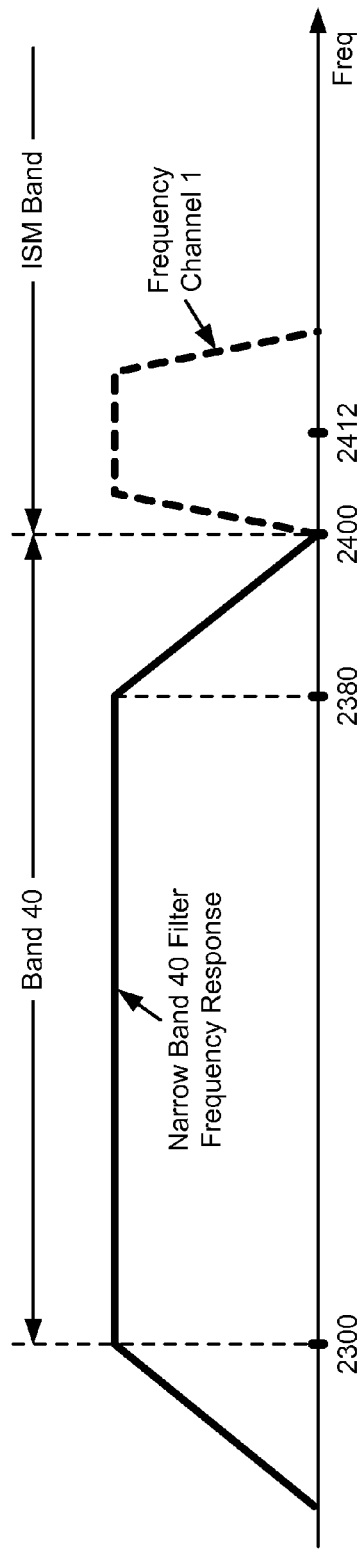

WIRELESS DEVICE WITH FILTERS TO SUPPORT CO-EXISTENCE IN ADJACENT FREQUENCY BANDS

CLAIM OF PRIORITY UNDER 35 U.S.C. §119

The present Application for Patent claims priority to Provisional U.S. Application Ser. No. 61/602,401, entitled "WIRELESS DEVICE WITH FILTERS TO SUPPORT CO-EXISTENCE ON ADJACENT FREQUENCY BANDS," filed Feb. 23, 2012, assigned to the assignee hereof, and expressly incorporated herein by reference.

BACKGROUND

I. Field

The present disclosure relates generally to electronics, and more specifically to a wireless device.

II. Background

A wireless device (e.g., a cellular phone or a smartphone) in a wireless communication network may transmit and receive data for two-way communication. The wireless device may include a transmitter for data transmission and a receiver for data reception. For data transmission, the transmitter may modulate a radio frequency (RF) carrier signal with data to obtain a modulated RF signal, amplify the modulated RF signal to obtain an output RF signal having the proper transmit power level, and transmit the output RF signal via an antenna to a base station. For data reception, the receiver may obtain a received RF signal via the antenna and may condition and process the received RF signal to recover data sent by the base station.

A wireless device may include multiple transmitters and multiple receivers to support simultaneous communication with multiple wireless networks. A transmitter for one wireless network may interfere with a receiver for another wireless network in certain scenarios and may degrade performance.

BRIEF DESCRIPTION OF THE DRAWINGS

FIGS. 4A and 4B show exemplary frequency responses of a full filter and a narrow filter, respectively, for Band 40.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

A wireless device with filters to support simultaneous communication (i.e., co-existence) with multiple wireless networks in adjacent frequency bands is disclosed herein. The multiple wireless networks may operate in frequency bands that are adjacent or close to each other. The wireless device may include multiple transceivers for communication with the multiple wireless networks. A transceiver for one wireless network may cause interference to another transceiver for another wireless network. The filters may mitigate interference between the transceivers so that good performance can be achieved for the wireless device for all wireless networks.

Figure 1:
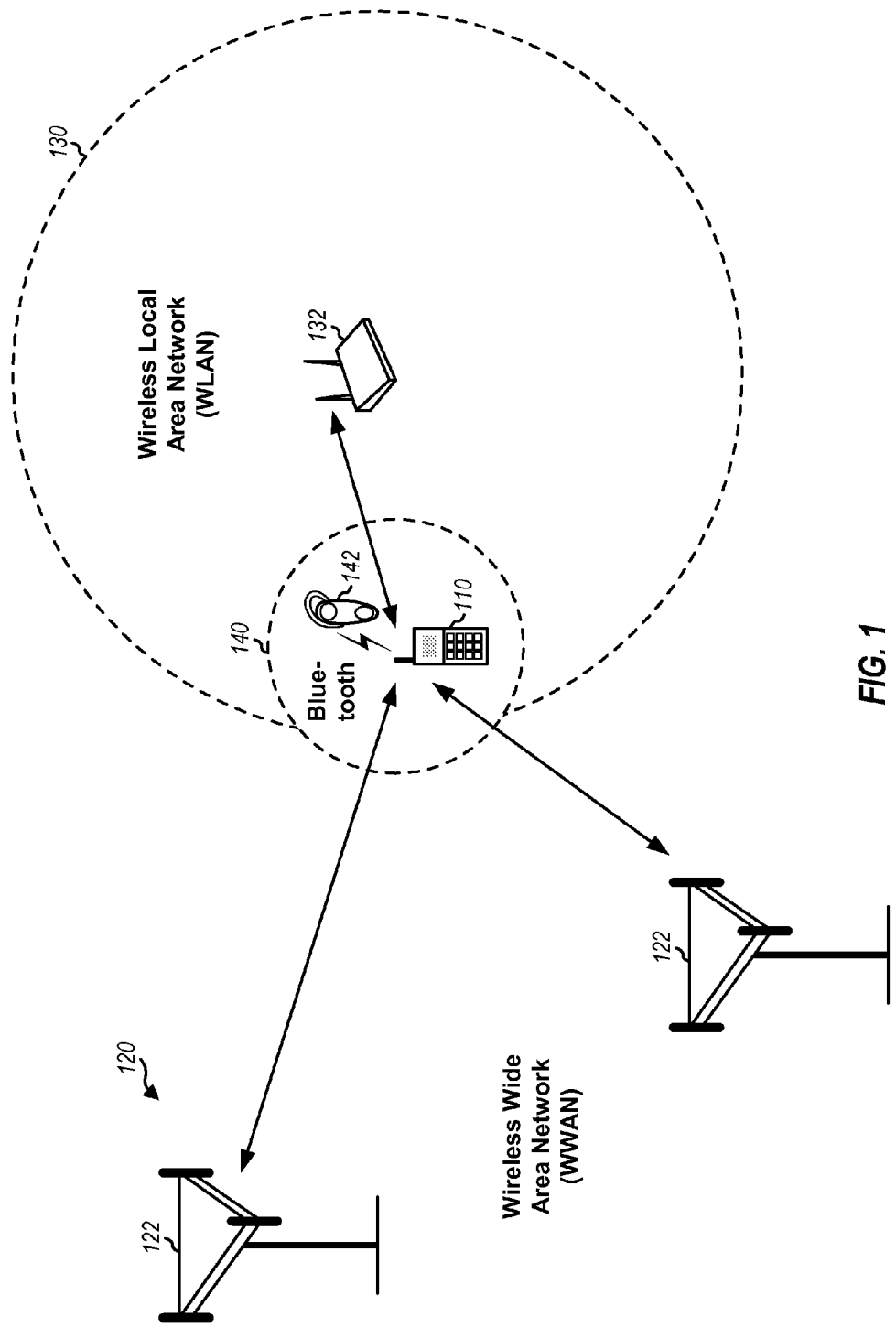
FIG. 1 shows a wireless device capable of communicating with different wireless communication networks.

FIG. 1 shows a wireless device 110 capable of communicating with different wireless communication networks such as a wireless wide area network (WWAN) 120, a wireless local area network (WLAN) 130, and a wireless personal area network (WPAN) 140. WWAN 120 provides communication coverage for a large geographic area such as, e.g., a city, a state, or an entire country. WWAN 120 may be a cellular network such as a Code Division Multiple Access (CDMA) network, a Global System for Mobile Communications (GSM) network, a Long Term Evolution (LTE) network, etc. A CDMA network may implement Wideband CDMA (WCDMA), cdma2000, or some other version of CDMA. WWAN 120 may include a number of base stations and other network entities that support communication for wireless devices within the coverage area of the WWAN. For simplicity, FIG. 1 shows only two base stations 122 in WWAN 120.

WLAN 130 provides communication coverage for a medium geographic area such as, e.g., a building, a home, etc. WLAN 130 may include any number of access points and other network entities (e.g., hubs and routers) that support communication for any number of stations within the coverage area of the WLAN. For simplicity, FIG. 1 shows only one access point 132 in WLAN 130. WLAN 130 may implement one or more air interfaces in the IEEE 802.11 family of standards and/or other WLAN standards.

WPAN 140 provides communication coverage for a small geographic area and supports communication between wireless device 110 and a headset 142. In general, WPAN 140 may include any number of WPAN devices and any type of WPAN devices. WPAN 140 may implement Bluetooth and/or other WPAN standards.

Wireless device 110 may be able to communicate with one or more wireless networks. Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may be capable of communicating with WWAN 120, WLAN 130 and/or WPAN 140, possibly concurrently. Wireless device 110 may support one or more radio technologies for wireless communication such as LTE, cdma2000, WCDMA, GSM, IEEE 802.11, Bluetooth, etc.

Figure 2:
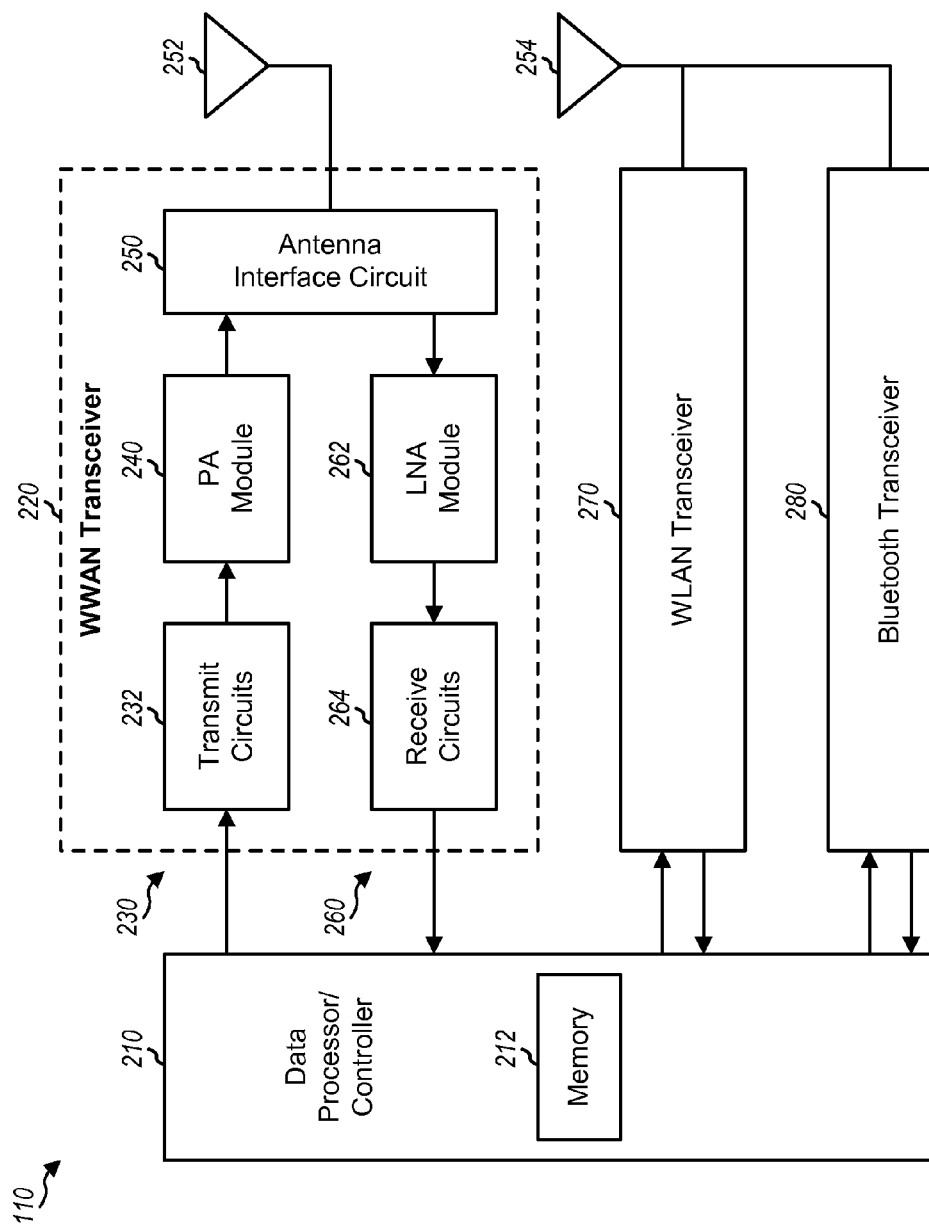
FIG. 2 shows a block diagram of the wireless device in FIG. 1.

FIG. 2 shows a block diagram of an exemplary design of wireless device 110 in FIG. 1. In the exemplary design shown in FIG. 2, wireless device 110 includes a data processor/controller 210, a WWAN transceiver 220, a WLAN transceiver 270, a WPAN transceiver 280, an antenna 252 for WWAN, and an antenna 254 for WLAN and WPAN. WWAN transceiver 220 includes a transmitter 230 and a receiver 260 that support bi-directional wireless communication with a WWAN. Transceivers 270 and 280 may each include a transmitter and a receiver to support wireless communication with a WLAN and a WPAN, respectively. For simplicity, details of transceivers 270 and 280 are not shown in FIG. 2.

In the transmit path of WWAN transceiver 220, data processor 210 processes (e.g., encodes and modulates) data to be transmitted and provides an analog output signal to transmitter 230. Within transmitter 230, transmit circuits 232 amplify, filter, and upconvert the analog output signal from baseband to RF and provide an input RF signal. Transmit circuits 232 may include amplifiers, filters, mixers, a driver amplifier, an oscillator, a local oscillator (LO) generator, a phase locked loop (PLL), etc. A power amplifier (PA) module 240 receives and amplifies the input RF signal and provides an output RF signal having the proper output power level. PA module 240 may include a power amplifier, a driver amplifier, filters, switches, matching circuits, etc. The output RF signal is routed through an antenna interface circuit 250 and transmitted via antenna 252 to one or more base stations in a WWAN. Antenna interface circuit 250 may include one or more switches, duplexers, diplexers, directional couplers, etc.

In the receive path of WWAN transceiver 220, antenna 252 receives signals from base stations in the WWAN and/or other transmitter stations and provides a received RF signal, which is routed through antenna interface circuit 250 and provided to receiver 260. Within receiver 260, a low noise amplifier (LNA) module 262 amplifies the received RF signal and provides an LNA output signal. Receive circuits 264 amplify, filter, and downconvert the LNA output signal from RF to baseband and provide an analog input signal to data processor 210. Receive circuits 264 may include amplifiers, filters, mixers, an oscillator, an LO generator, a PLL, etc.

FIG. 2 shows an exemplary design of transmitter 230 and receiver 260. Transmitter 230 and/or receiver 260 may include different and/or additional circuits not shown in FIG. 2. For example, transmitter 230 may include filters, matching circuits, etc., which are not explicitly shown in FIG. 2 for simplicity. All or a portion of transceiver 220 may be implemented on one or more analog integrated circuits (ICs), RF ICs (RFICs), mixed-signal ICs, etc. For example, transmit circuits 232, PA module 240, LNA module 262, and receive circuits 264 may be implemented on an RFIC. PA module 240 and possibly other circuits may also be implemented on a separate IC or circuit module.

WLAN transceiver 270 may receive and process signals for communication with access points in a WLAN. WPAN transceiver 280 may receive and process signals for communication with WPAN devices. Transceivers 270 and 280 may each include circuits similar to the circuits in WWAN transceiver 220.

Data processor/controller 210 may perform various functions for wireless device 110. For example, data processor 210 may perform processing for data being transmitted via transmitter 230 and data being received via receiver 260. Controller 210 may control the operation of transmit circuits 232, receive circuits 264, PA module 240, LNA module 262, antenna interface circuit 250, etc. A memory 212 may store program codes and data for data processor/controller 210.

Data processor/controller 210 may be implemented on one or more application specific integrated circuits (ASICs) and/or other ICs.

Wireless device 110 may support communication with different wireless networks such as WWAN 120, WLAN 130, and/or WPAN 140 in FIG. 1. Each wireless network may support communication in one or more frequency bands. For example, WWAN 120 may be an LTE network that supports communication in one or more of the following frequency bands:

Band 38 from 2570 to 2620 MHz for time division duplexing (TDD),
Band 40 from 2300 to 2400 MHz for TDD,
Band 41 from 2496 to 2690 MHz for TDD, and/or
Other bands.

WLAN 130 may be a Wi-Fi network that supports communication in an industrial, scientific and medical (ISM) band from 2400 to 2500 MHz. WPAN 140 may support Bluetooth in the ISM band from 2400 to 2500 MHz. WWAN 120, WLAN 130 and WPAN 140 may also support communication in other frequency bands.

Figure 3:
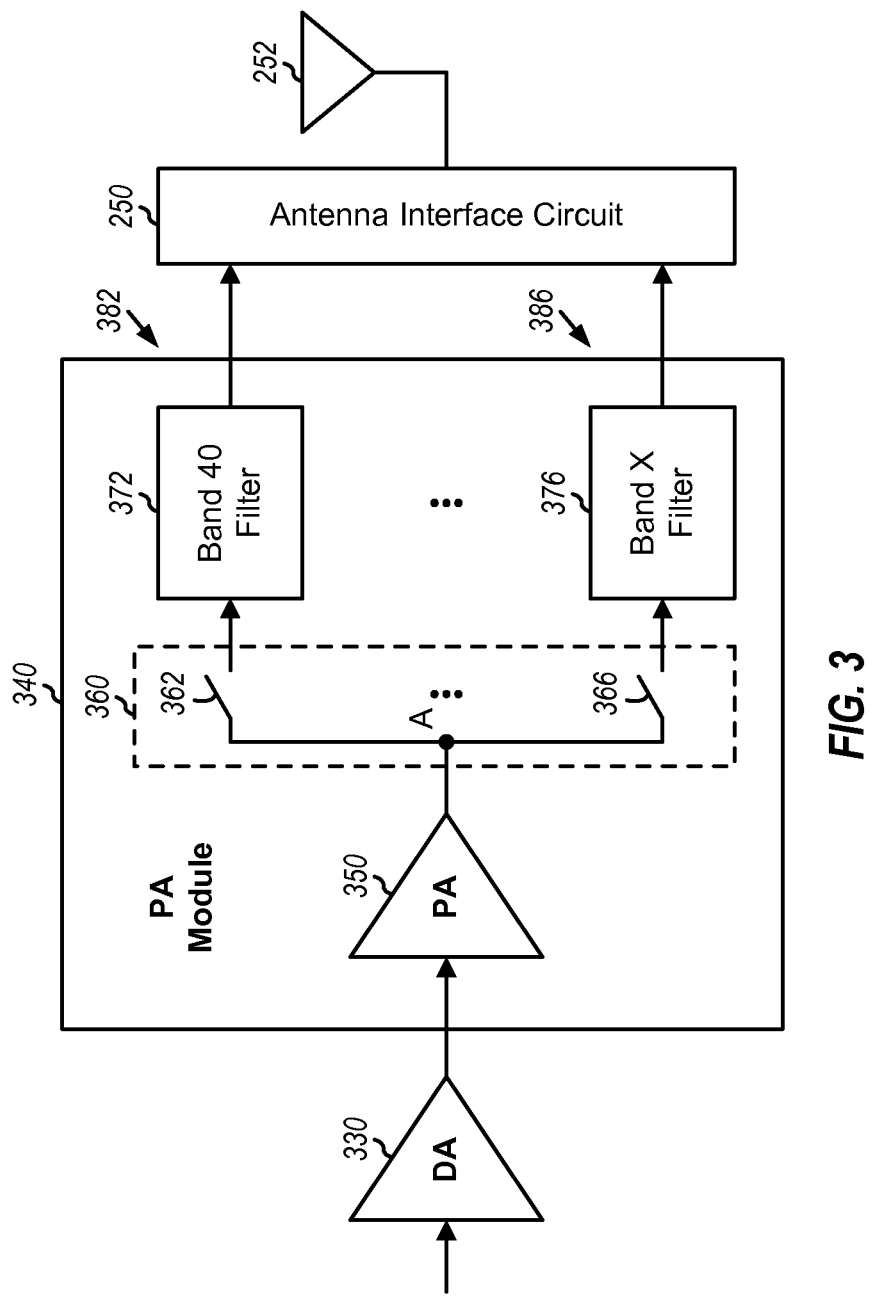
FIG. 3 shows a block diagram of a power amplifier (PA) module.

FIG. 3 shows a block diagram of a PA module 340, which is one exemplary design of PA module 240 in WWAN transceiver 220 in FIG. 2. Within PA module 340, a power amplifier (PA) 350 has its input coupled to the input of PA module 340 and its output coupled to a switchplexer 360. Switchplexer 360 includes switches 362 to 366 having their first terminal coupled to node A and their second terminal coupled to filters 372 to 376, respectively. Node A corresponds to the output of power amplifier 350. Filters 372 to 376 have their inputs coupled to switches 362 to 366, respectively, and their outputs coupled to antenna interface circuit 250. Filters 372 to 376 may comprise bandpass filters, lowpass filters, highpass filters, etc. Filters 372 to 376 may be implemented with surface acoustic wave (SAW) filters, ceramic filters, micro-electro-mechanical systems (MEMS) filters, or filters of other type.

A driver amplifier (DA) 330 receives and amplifies a modulated RF signal and provides an input RF signal to PA module 340. Driver amplifier 330 may be part of transmit circuits 232 in FIG. 2 (as shown in FIG. 3) or may be part of PA module 340 (not shown in FIG. 3). Within PA module 340, power amplifier 350 receives and amplifies the input RF signal from driver amplifier 330 and provides an amplified RF signal. Switchplexer 360 receives the amplified RF signal from power amplifier 350 and provides the amplified RF signal to one of filters 372 to 376. One of switches 362 to 366 within switchplexer 360 may be selected at any given moment. The selected switch is closed and passes the amplified RF signal to the associated filter. The unselected switches are opened. The filter coupled to the selected switch receives the amplified RF signal via the closed switch and provides an output RF signal to antenna interface circuit 250.

Filters 372 to 376 cover different frequency bands of interest and supported by wireless device 110. In the example shown in FIG. 3, filter 372 covers Band 40 and is also referred to as Band 40 filter 372. Filter 376 covers band X, which may be Band 38, Band 41, etc. Filters 372 to 376 may also cover other frequency bands. Each filter may be designed to pass signals within its frequency band and to attenuate signals outside its frequency band.

FIG. 4A shows an exemplary frequency response of Band 40 filter 372 in FIG. 3. Band 40 filter 372 has a passband of 2300 to 2400 MHz, which is the frequency range of Band 40. Band 40 filter 372 rolls off to the left of 2300 MHz in a lower transition band and also rolls off to the right of 2400

MHz in an upper transition band. The width of each transition band (i.e., the steepness of the roll-off) is dependent on the type of filter used for Band 40 filter 372. As shown in FIG. 4A, the upper transition band of Band 40 filter 372 overlaps the ISM band from 2400 to 2500 MHz.

Wireless device 110 may support communication with multiple wireless networks. For example, wireless device 110 may support simultaneous communication with a WWAN in Band 40 and also with a WLAN in the ISM band. In this case, desired signals from WWAN transceiver 220 may couple to WLAN transceiver 270 via antennas 252 and 254, and the coupled signals may act as undesired signals to WLAN transceiver 270. Both antennas 252 and 254 may be implemented on wireless device 110, and there may be a limit on the amount of isolation that can be achieved between the two antennas.

As shown in FIG. 4A, undesired signals in the upper transition band of Band 40 filter 372 may cause interference to desired signals on WLAN frequency channel 1 in the 2.4 GHz ISM band. Frequency channel 1 is centered at 2412 MHz and has a bandwidth of 22 MHz for IEEE 802.11b. The interference from the undesired signals in Band 40 may severely degrade the performance of communication with the WLAN in the ISM band and may make frequency channel 1 unusable for WLAN communication.

In an aspect of the present disclosure, a narrow filter for a band of interest (e.g., Band 40) may be located before a power amplifier and may be used to attenuate signals in the band so that interference to an adjacent band can be reduced. Placing the narrow filter before the power amplifier may provide certain advantages as compared to placing the narrow filter after the power amplifier, as described below.

Figure 5A:
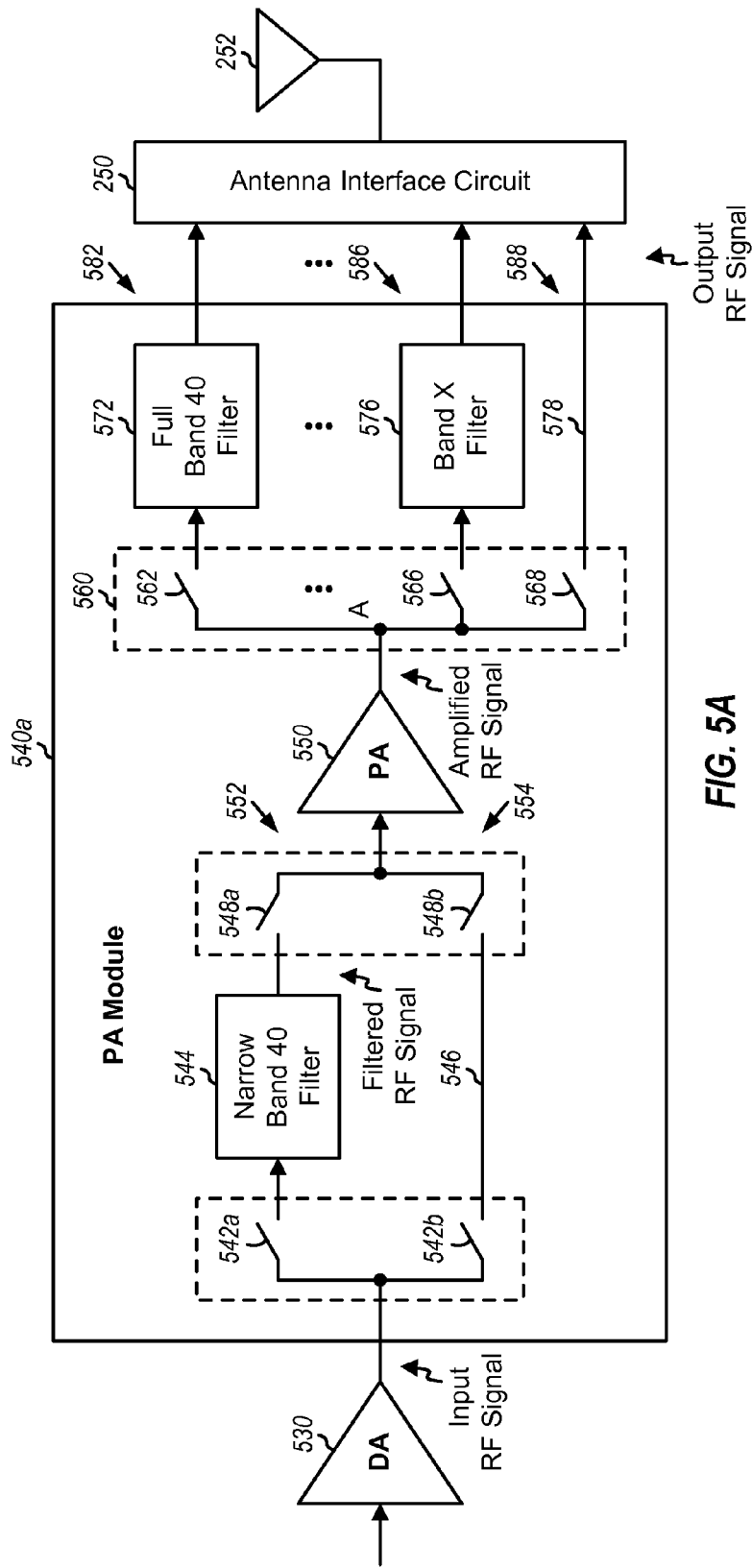
FIGS. 5A and 5B show block diagrams of two exemplary designs of a PA module supporting co-existence with multiple wireless networks in adjacent frequency bands.

FIG. 5A shows a block diagram of a PA module 540a supporting co-existence with multiple wireless networks in adjacent frequency bands. PA module 540a is one exemplary design of PA module 240 in FIG. 2.

In the exemplary design shown in FIG. 5A, within PA module 540a, switches 542a and 542b have their first terminal coupled to the input of PA module 540a, and switches 548a and 548b have their first terminal coupled to the input of a power amplifier 550. A narrow Band 40 filter 544 is coupled between the second terminal of switch 542a and the second terminal of switch 548a. A bypass path 546 is coupled between the second terminal of switch 542b and the second terminal of switch 548b.

In the exemplary design shown in FIG. 5A, a switchplexer 560 includes switches 562 to 568 having their first terminal coupled to the output of power amplifier 550, which is node A. A full Band 40 filter 572 has its input coupled to a second terminal of switch 562 and its output coupled to antenna interface circuit 250. A Band X filter 576 has its input coupled to a second terminal of switch 566 and its output coupled to antenna interface circuit 250. Additional filters (not shown in FIG. 5A) may also be coupled between switchplexer 560 and antenna interface circuit 250. Filters 572 to 576 may be implemented with SAW filters, ceramic filters, MEMS filters, etc. A bypass path 578 is coupled between a second terminal of switch 568 and antenna interface circuit 250. Bypass path 578 may be included (as shown in FIG. 5A) or may be omitted (not shown in FIG. 5A).

In general, filter 544 and filters 572 to 576 may cover any frequency band of interest and supported by wireless device 110. In the exemplary design shown in FIG. 5A, filter 544 covers Band 40 but has a more narrow bandwidth and is referred to as narrow Band 40 filter 544. Filter 572 also covers Band 40 and has a full bandwidth (e.g., from 2300 to 2400 MHz as shown in FIG. 4A) and is referred to as full Band 40 filter 572. Filter 576 covers Band X, which may be Band 38, Band 41, etc. Filter 544 and filters 572 to 576 may also cover other frequency bands, e.g., an eXtended Global Platform (XGP) band used for LTE TDD and covering a frequency range from 2545 to 2575 MHz. Each filter may be designed to pass signals within its frequency band and to attenuate signals outside its frequency band.

In the exemplary design shown in FIG. 5A, PA module 540a includes two input signal paths 552 and 554 prior to power amplifier 550. The first input signal path 552 includes narrow Band 40 filter 544. The second input signal path 554 includes bypass path 546. Either the first or second input signal path may be selected at any given moment by controlling switches 542 and 548. PA module 540a also includes multiple output signal paths 582 to 588 after power amplifier 550. The first output signal path 582 includes switch 562 and full Band 40 filter 572. One or more other output signal paths may each include a filter and an associated switch. Output signal path 588 includes switch 568 and bypass path 578. One of the output signal paths may be selected at any given moment by controlling switches 562 to 568.

A driver amplifier 530 receives and amplifies a modulated RF signal and provides an input RF signal to PA module 540a. Driver amplifier 530 may be part of transmit circuits 232 in FIG. 2 (as shown in FIG. 5A) or may be part of PA module 540a (not shown in FIG. 5A). Within PA module 540a, the input RF signal is routed through either (i) the first input signal path 552 comprising narrow Band 40 filter 544 or (ii) the second input signal path 554 comprising bypass path 546. Narrow Band 40 filter 544 filters the input RF signal if the first input signal path 552 is selected. Power amplifier 550 receives and amplifies the RF signal from either switch 548a or 548b and provides an amplified RF signal. Switchplexer 560 receives the amplified RF signal from power amplifier 550 and provides the amplified RF signal to one of filters 572 to 576 via one of switches 562 to 566 or to bypass path 578 via switch 568. If one of filters 572 to 576 is selected, then the selected filter receives the amplified RF signal via the associated switch and provides an output RF signal to antenna interface circuit 250. If bypass path 578 is selected, then the amplified RF signal is provided as the output RF signal.

FIG. 4B shows an exemplary frequency response of narrow Band 40 filter 544 in FIG. 5A. In this exemplary design, narrow Band 40 filter 544 has a passband of 2300 to 2380 MHz, which is smaller than the frequency range of Band 40. Narrow Band 40 filter 544 rolls off to the left of 2300 MHz in a lower transition band and also rolls off to the right of 2380 MHz in an upper transition band. As shown in FIG. 4B, the upper transition band of narrow Band 40 filter 544 is within Band 40. In contrast, full Band 40 filter 572 has a passband of 2300 to 2400 MHz and an upper transition band that is outside of Band 40 and within the ISM band, as shown in FIG. 4A.

Referring back to FIG. 5A, the first input signal path 552 comprising narrow Band 40 filter 544 may be selected whenever there is co-existence between a WWAN in Band 40 and a WLAN in the ISM band. In this case, narrow Band 40 filter 544 would attenuate undesired signals in the ISM band, which would then result in less interference to desired signals for the WLAN in the ISM band. The performance of communication with the WLAN may be minimally degraded by the undesired signals from Band 40 for communication with the WWAN. The second input signal path 554 comprising bypass path 546 may be selected when there is no co-existence between a WWAN in Band 40 and a WLAN in the ISM band. In this case, a smaller insertion loss may be obtained for the input RF signal via bypass path 546.

Narrow Band 40 filter 544 and full Band 40 filter 572 may be selected in various manners. In one exemplary design, only narrow Band 40 filter 544 may be selected for communication with a WWAN in Band 40 when there is co-existence with a WLAN in the ISM band. In another exemplary design, both narrow Band 40 filter 544 and full Band 40 filter 572 may be selected for communication with a WWAN in Band 40 when there is co-existence with a WLAN in the ISM band. Narrow Band 40 filter 544 and/or full Band 40 filter 572 may also be selected based on other criteria. For example, narrow Band 40 filter 544 may be selected only if energy is detected on frequency channel 1 in the ISM band. In an exemplary design, only full Band 40 filter 572 may be selected for communication with a WWAN in Band 40 when there is no co-existence with a WLAN in the ISM band.

Figure 5B:
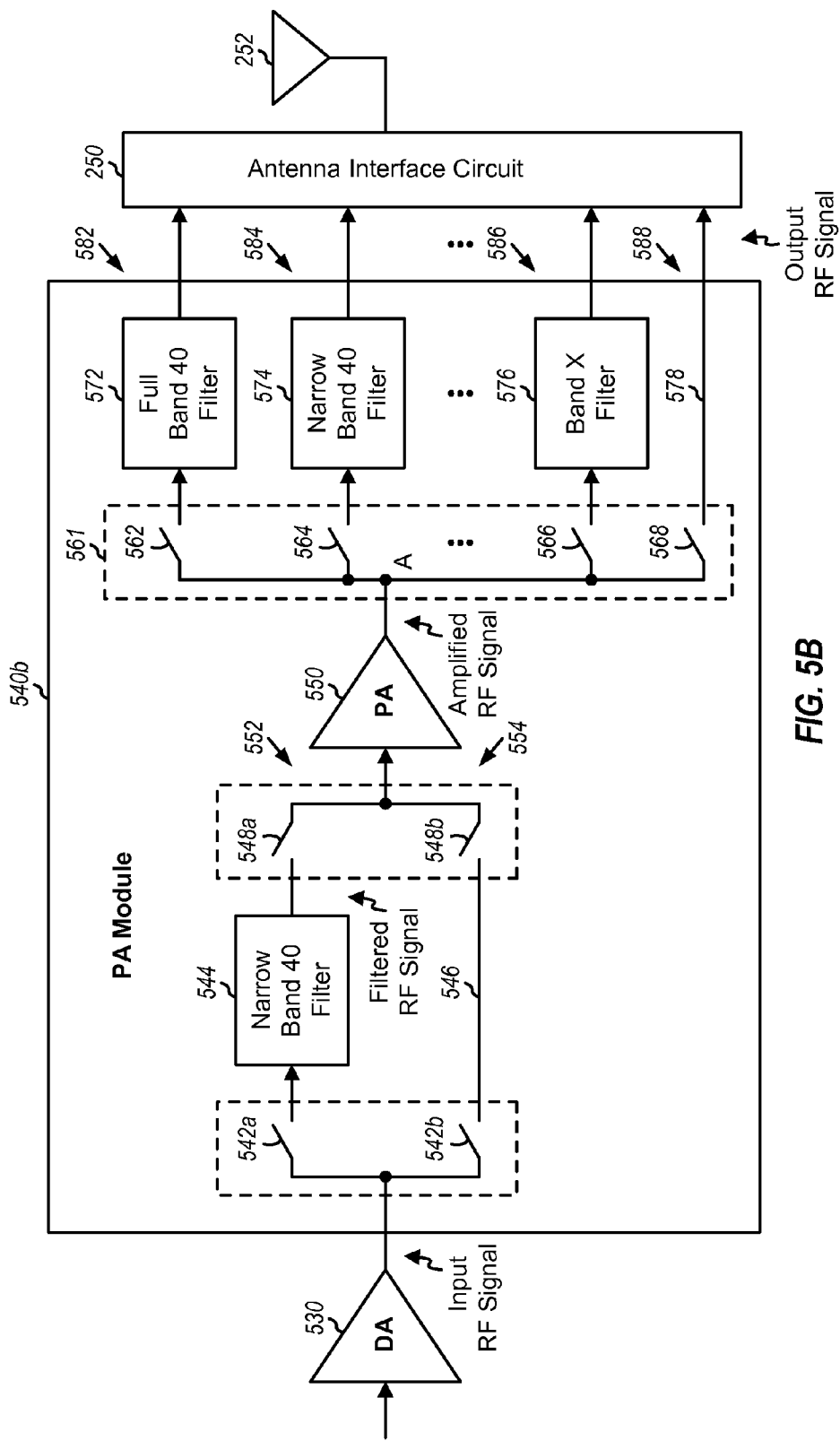

FIG. 5B shows a block diagram of a PA module 540b supporting co-existence with multiple wireless networks in adjacent frequency bands. PA module 540b is another exemplary design of PA module 240 in FIG. 2.

In the exemplary design shown in FIG. 5B, PA module 540b includes switches 542a, 542b, 548a and 548b, narrow Band 40 filter 544, bypass path 546, and power amplifier 550, which are coupled as described above for FIG. 5A. PA module 540b further includes a switchplexer 561 coupled to the output power amplifier 550, which corresponds to node A. Switchplexer 561 includes switches 562 to 566 having their first terminal coupled to node A and their second terminal coupled to filters 572 to 576, respectively. Filters 572 to 576 have their inputs coupled to switches 562 to 566, respectively, and their outputs coupled to antenna interface circuit 250. In the exemplary design shown in FIG. 5B, switchplexer 561 further includes switch 568 having its first terminal coupled to node A and its second terminal coupled to bypass path 578, which is further coupled to antenna interface circuit 250. Switch 568 and bypass path 578 may also be omitted.

Filters 572 to 576 may cover different frequency bands of interest and supported by wireless device 110. In the exemplary design shown in FIG. 5B, filter 572 covers Band 40 and has a nominal bandwidth, e.g., from 2300 to 2400 MHz as shown in FIG. 4A. Filter 574 covers Band 40 but has a more narrow bandwidth, e.g., from 2300 to 2380 MHz as shown in FIG. 4B. Filter 576 covers Band X. Filters 572 to 576 may also cover other frequency bands. Narrow Band 40 filters 544 and 574 may have the same or different frequency responses, may have the same or different bandwidths, and may be implemented with the same or different types of filters.

In the exemplary design shown in FIG. 5B, PA module 540b includes first input signal path 552 and second input signal path 554 prior to power amplifier 550, as described above for FIG. 5A. PA module 540b further includes multiple output signal paths 582 to 588 after power amplifier 550. The first output signal path 582 includes switch 562 and full Band 40 filter 572. The second output signal path 584 includes switch 564 and narrow Band 40 filter 574. One or more other output signal paths may each include a filter and an associated switch. Output signal path 588 includes switch 568 and bypass path 578. One of the output signal paths may be selected at any given moment by controlling switches 562 to 568.

In one exemplary design, the first input signal path 552 comprising narrow Band 40 filter 544 and the second output signal path 584 comprising narrow Band 40 filter 574 may be selected when there is co-existence between a WWAN in Band 40 and a WLAN in the ISM band. The second input signal path 554 comprising bypass path 546 and the first output signal path 582 comprising full Band 40 filter 572 may be selected for communication with a WWAN in Band 40 when there is no co-existence with a WLAN in the ISM band. The second input signal path 554 comprising bypass path 546 and another output signal path comprising another filter (e.g., filter 576) may be selected for communication with another wireless network and/or in another frequency band.

Table 1 lists a set of configurations that may be supported by a PA module. PA module 540a in FIG. 5A does not include narrow Band 40 filter 574 after power amplifier 550 and hence supports only configurations 1, 3, 5 and 6 in Table 1. PA module 540b in FIG. 5B includes narrow Band 40 filter 574 after power amplifier 550 and hence supports all six configurations 1 to 6 in Table 1. A PA module may include more and/or different configurations than the configurations listed in Table 1.

TABLE 1

| Config | Input Signal Path | Output Signal Path | Description |
|---|---|---|---|
| 1 | Bypass | Full Band 40 Filter | For WWAN in Band 40 without co-existence with WLAN in ISM band |
| 2 | Bypass | Narrow Band 40 Filter | For WWAN in Band 40 with co-existence; Provide good interference rejection in ISM band |
| 3 | Narrow Band 40 Filter | Full Band 40 Filter | For WWAN in Band 40 with co-existence; Provide good interference rejection in ISM band |
| 4 | Narrow Band 40 Filter | Narrow Band 40 Filter | For WWAN in Band 40 with co-existence; Provide best interference rejection in ISM band |
| 5 | Narrow Band 40 Filter | Bypass | For WWAN in Band 40 with co-existence |
| 6 | Bypass | Band X Filter | For WWAN in Band X, e.g., Band 38 |

FIGS. 5A and 5B show two exemplary designs of using a narrow Band 40 filter prior to a power amplifier to enable co-existence between a WWAN in Band 40 and a WLAN in the ISM band. In general, the techniques of using a narrow filter located prior to a power amplifier may enable co-existence between multiple wireless networks in adjacent or nearby frequency bands. The techniques may be used for Band 40 and the ISM band, as shown in FIGS. 4A to 5B. The techniques may also be used to enable co-existence in other adjacent or nearby frequency bands. For example, the techniques may be used to enable co-existence in the ISM band from 2400 to 2500 MHz and Band 41 from 2500 to 2690 MHz. A wireless device may include a narrow Band 41 filter having a more narrow bandwidth from 2520 to 2690 MHz located prior to a power amplifier. The wireless device may also include a Band 41 filter having a nominal bandwidth from 2500 to 2690 MHz located after the power amplifier. The narrow Band 41 filter may attenuate undesired signals in the lower part of Band 41 in order to reduce interference to desired signals for a WLAN in the ISM band.

Using a narrow Band 40 filter located before a power amplifier (e.g., as shown in FIGS. 5A and 5B) may provide certain advantages. First, the narrow Band 40 filter before the power amplifier may be used to reduce the level of noise and distortion generated by circuits that precede the power amplifier, e.g., drive amplifier 530, upconverter, etc. Noise and distortion that falls in the ISM band from signals in Band 40 may be dependent on the actual frequencies (or frequency offset) of operation in the ISM band and Band 40. Certain frequency offsets may result in noise and distortion from the preceding circuits dominating the total noise and distortion at an output of a transmitter. In these instances, using the narrow Band 40 filter prior to the power amplifier may reduce the level of noise and distortion. This may be achieved without added insertion loss after the power amplifier. In some cases, it may be possible to select output bypass path 578 and not use any transmit filter after the power amplifier in order to reduce insertion loss after the power amplifier.

Second, using the narrow Band 40 filter prior to the power amplifier as well as a full Band 40 filter or another narrow Band 40 filter after the power amplifier may improve performance. The narrow Band 40 filter before the power amplifier may provide sufficient rejection in order to support co-existence in the ISM band. The full Band 40 filter after the power amplifier may provide rejection of spurious signals that may normally occur, such as harmonics and wideband noise. The full Band 40 filter may not reduce noise and distortion falling in the lower portion of the ISM band since it may be too close to Band 40. Filter selection may be based on one or more of the following: (i) whether there is coexistence between Band 40 and the ISM band, (ii) the transmit power of operation since noise and distortion may have a positive and non-linear relationship to transmit power, and (iii) the actual frequency offsets between Band 40 operation and ISM band operation.

Placing the narrow Band 40 filter after the power amplifier (and not performing filtering prior to the power amplifier) may increase insertion loss associated with this filter. The higher insertion loss may reduce the efficiency of the power amplifier, which may be undesirable, especially at high output power levels.

In an exemplary design, an apparatus (e.g., a wireless device, an IC, a circuit module, etc.) may comprise a narrow filter and a power amplifier. The narrow filter (e.g., narrow Band 40 filter 544 in FIGS. 5A and 5B) may be for a first frequency band and may have a first bandwidth that is more narrow than the first frequency band. For example, the first bandwidth may cover only a portion of the first frequency band (e.g., as shown in FIG. 4B) instead of the entire first frequency band (e.g., as shown in FIG. 4A). The narrow filter may receive and filter an input RF signal and provide a filtered RF signal. The power amplifier (e.g., power amplifier 550 in FIGS. 5A and 5B) may have an input operatively coupled to an output of the narrow filter. The power amplifier may receive and amplify the filtered RF signal and provide an amplified RF signal.

In an exemplary design, the apparatus may include multiple signal paths prior to the power amplifier. A first signal path (e.g., signal path 552 in FIGS. 5A and 5B) may include the narrow filter and may be coupled to the input of the power amplifier via a first switch (e.g., switch 548*a*). A bypass signal path (e.g., signal path 554) may be coupled to the input of the power amplifier via a second switch (e.g., switch 548*b*). The bypass signal path may provide the input RF signal to the power amplifier when the narrow filter is not selected. The power amplifier may receive and amplify the input RF signal (instead of the filtered RF signal) when the narrow filter is not selected.

In an exemplary design, the apparatus may include a full filter (e.g., full Band 40 filter 572 in FIGS. 5A and 5B) for the first frequency band and having a second bandwidth that is larger than the first bandwidth of the narrow filter. The full filter may have an input operatively coupled to the output of the power amplifier, e.g., via a switch. The full filter may receive and filter the amplified RF signal and provide an output RF signal when it is selected for use.

In an exemplary design, the apparatus may include a second narrow filter (e.g., narrow Band 40 filter 574 in FIG. 5B) for the first frequency band and having a bandwidth that is more narrow than the first frequency band. The second narrow filter may have an input operatively coupled to the output of the power amplifier, e.g., via a switch. The second narrow filter may receive and filter the amplified RF signal and provide the output RF signal when it is selected for use.

In an exemplary design, the apparatus may include a bypass signal path (e.g., bypass signal path 578 in FIGS. 5A and 5B) coupled between the output of the power amplifier and an antenna interface circuit. This bypass signal path may be selected to provide the amplified RF signal from the power amplifier as the output RF signal, without going through a transmit filter after the power amplifier.

In an exemplary design, the first frequency band may correspond to Band 40. The first bandwidth of the narrow filter may be smaller than the bandwidth of Band 40. The second bandwidth of the full filter may be equal to or larger than the bandwidth of Band 40. The bandwidth of the second narrow filter may also be smaller than the bandwidth of Band 40. The narrow filter may have a transition band within the first frequency band, e.g., as shown in FIG. 4B. The full filter may have transition bands outside the first frequency band, e.g., as shown in FIG. 4A.

In an exemplary design, the narrow filter before the power amplifier may be selected or bypassed based on at least one criterion. The narrow filter may filter the input RF signal for the first frequency band only when it is selected. In an exemplary design, the full filter and the second narrow filter may each be selected or bypassed. The full filter or the second narrow filter may filter the amplified RF signal for the first frequency band when the filter is selected.

In an exemplary design, the narrow filter may be selected when the apparatus concurrently communicates with a first wireless network in the first frequency band (e.g., an LTE network in Band 40) and with a second wireless network in a second frequency band (e.g., a WLAN in the ISM band) that is adjacent to the first frequency band (e.g., for configuration 3, 4 or 5 in Table 1). In an exemplary design, the full filter may be selected when the apparatus communicates with the first wireless network in the first frequency band but not with the second wireless network in the second frequency band (e.g., for configuration 1 in Table 1). In another exemplary design, the narrow filter and the full filter may both be selected when the apparatus concurrently communicates with the first wireless network in the first frequency band and with the second wireless network in the second frequency band (e.g., for configuration 3 in Table 1). In yet another exemplary design, the narrow filter and the second narrow filter may both be selected when the apparatus concurrently communicates with the first wireless network in the first frequency band and with the second wireless network in the second frequency band (e.g., for configuration 4 in Table 1). The narrow filter, the full filter, and the second narrow filter may also be selected in other manners.

Figure 6:
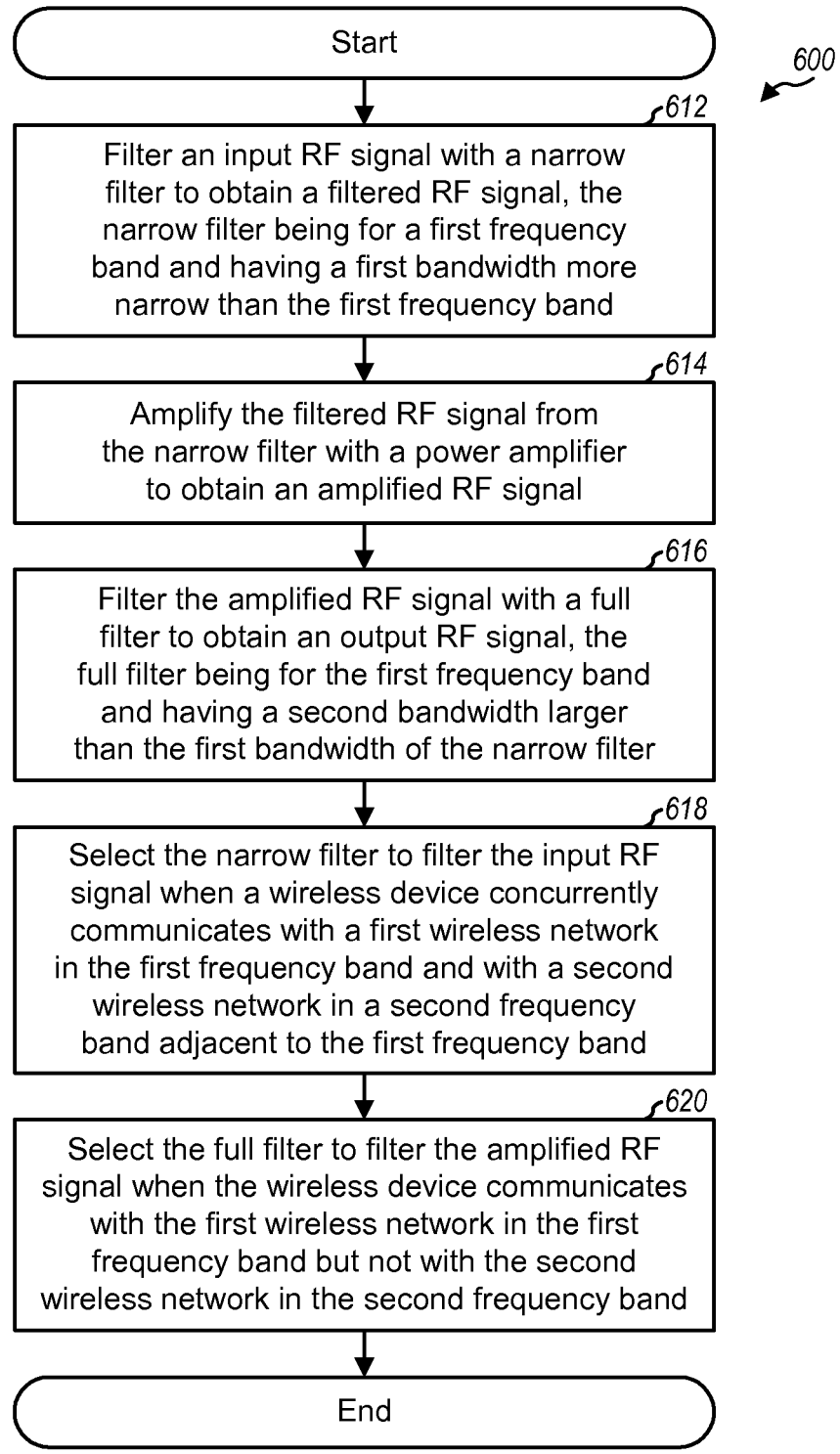
FIG. 6 shows a process for performing filtering by a wireless device.

FIG. 6 shows an exemplary design of a process 600 for performing filtering by a wireless device. An input RF signal may be filtered with a narrow filter (e.g., narrow Band 40 filter 544 in FIGS. 5A and 5B) to obtain a filtered RF signal (block 612). The narrow filter may be for a first frequency band and may have a first bandwidth that is more narrow than the first frequency band. The filtered RF signal from the narrow filter may be amplified with a power amplifier to obtain an amplified RF signal (block 614). The input RF signal (instead of the filtered RF signal) may be amplified with the power amplifier and the narrow filter may be bypassed when the narrow filter is not selected for use.

In an exemplary design, the amplified RF signal from the power amplifier may be filtered with a full filter (e.g., full Band 40 filter 572 in FIGS. 5A and 5B) to obtain an output RF signal (block 616). The full filter may also be for the first frequency band and may have a second bandwidth that is larger than the first bandwidth of the narrow filter. In another exemplary design, the amplified RF signal may be filtered with a second narrow filter (e.g., narrow Band 40 filter 574 in FIG. 5B) to obtain the output RF signal. The second narrow filter may also be for the first frequency band and may have a bandwidth that is more narrow than the first frequency band. In yet another exemplary design, the amplified RF signal may be provided via a bypass signal path (e.g., bypass signal path 578 in FIGS. 5A and 5B) as the output RF signal, without going through any transmit filter after the power amplifier.

In an exemplary design, the narrow filter may be selected to filter the input RF signal when the wireless device concurrently communicates with a first wireless network in the first frequency band (e.g., an LTE network in Band 40) and with a second wireless network in a second frequency band (e.g., a WLAN in ISM band) that is adjacent to the first frequency band (block 618). In an exemplary design, the full filter may be selected to filter the amplified RF signal when the wireless device communicates with the first wireless network in the first frequency band but not with the second wireless network in the second frequency band (block 620).

The PA module and/or filters described herein may be implemented on an IC, an analog IC, an RFIC, a mixed-signal IC, an ASIC, a circuit module, a hybrid module, a printed circuit board (PCB), an electronic device, etc. The PA module and/or filters may also be fabricated with various process technologies. Active circuits (e.g., transistors) for the PA module and/or filters may be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar trapnsistors (HBTs), high electron mobility transistors (HEMTs), silicon-on-insulator (SOI), etc.

An apparatus implementing the PA module and/or filters described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
    a narrow filter for a first frequency band and having a first bandwidth more narrow than the first frequency band, the narrow filter being configured as a passband filter to receive and filter an input radio frequency (RF) signal and provide a filtered RF signal;
    a power amplifier having an input operatively coupled to an output of the narrow filter, the power amplifier being configured to receive and amplify the filtered RF signal and provide an amplified RF signal;
    a first signal path comprising the narrow filter and coupled to a second signal path via a first switch; and
    a bypass signal path coupled to the second signal path via a second switch,
    wherein the second signal path is coupled to an input of the power amplifier.

2. The apparatus of claim 1, further comprising:
    a full filter for the first frequency band and having a second bandwidth larger than the first bandwidth of the narrow filter, the full filter having an input operatively coupled to an output of the power amplifier, the full filter being configured to receive and filter the amplified RF signal and provide an output RF signal.

3. The apparatus of claim 2, the first frequency band corresponding to Band 40, the first bandwidth of the narrow filter being within Band 40 and smaller than a bandwidth of Band 40, and the second bandwidth of the full filter being equal to or larger than the bandwidth of Band 40, wherein Band 40 is from 2300 to 2400 MHz.

4. The apparatus of claim 2, the narrow filter having a transition band within the first frequency band, and the full filter having transition bands outside the first frequency band.

5. The apparatus of claim 1, further comprising:
a second narrow filter for the first frequency band and having a bandwidth more narrow than the first frequency band, the second narrow filter having an input operatively coupled to an output of the power amplifier, the second narrow filter being configured to receive and filter the amplified RF signal and provide an output RF signal.

6. The apparatus of claim 1, further comprising:
a bypass signal path coupled between the output of the power amplifier and an antenna interface circuit.

7. The apparatus of claim 1, the narrow filter being selected or bypassed based on at least one criteria, and the narrow filter being configured to filter the input RF signal for the first frequency band when the narrow filter is selected.

8. The apparatus of claim 1, the narrow filter being selected when the apparatus concurrently communicates with a first wireless network in the first frequency band and with a second wireless network in a second frequency band adjacent to the first frequency band.

9. The apparatus of claim 2, the full filter being selected when the apparatus communicates with a first wireless network in the first frequency band but not with a second wireless network in a second frequency band adjacent to the first frequency band.

10. The apparatus of claim 2, the narrow filter and the full filter being both selected when the apparatus concurrently communicates with a first wireless network in the first frequency band and with a second wireless network in a second frequency band adjacent to the first frequency band.

11. The apparatus of claim 5, the narrow filter and the second narrow filter being both selected when the apparatus concurrently communicates with a first wireless network in the first frequency band and with a second wireless network in a second frequency band adjacent to the first frequency band.

12. A method comprising:
filtering an input radio frequency (RF) signal with a narrow filter configured as a passband filter to obtain a filtered RF signal, the narrow filter being for a first frequency band and having a first bandwidth more narrow than the first frequency band; and
amplifying the filtered RF signal from the narrow filter with a power amplifier to obtain an amplified RF signal,
wherein the narrow filter is selected when concurrently communicating with a first wireless network in the first frequency band and with a second wireless network in a second frequency band adjacent to the first frequency band.

13. The method of claim 12, further comprising:
filtering the amplified RF signal from the power amplifier with a full filter to obtain an output RF signal, the full filter being for the first frequency band and having a second bandwidth larger than the first bandwidth of the narrow filter.

14. The method of claim 12, further comprising:
filtering the amplified RF signal from the power amplifier with a second narrow filter to obtain an output RF signal, the second narrow filter being for the first frequency band and having a bandwidth more narrow than the first frequency band.

15. The method of claim 12, further comprising:
amplifying the input RF signal with the power amplifier and bypassing the narrow filter when the narrow filter is not selected for use.

16. An apparatus comprising:
first means for filtering configured as a passband filter to receive and filter an input radio frequency (RF) signal and provide a filtered RF signal, the first means for filtering being for a first frequency band and having a first bandwidth more narrow than the first frequency band;
means for amplifying configured to receive and amplify the filtered RF signal and provide an amplified RF signal;
a first signal path comprising the first means for filtering, the first signal path being coupled to a second signal path via a first means for switching; and
a bypass signal path coupled to the second signal path via a second means for switching,
wherein the second signal path is coupled to an input of the means for amplifying.

17. The apparatus of claim 16, further comprising:
second means for filtering configured to receive and filter the amplified RF signal and provide an output RF signal, the second means for filtering being for the first frequency band and having a second bandwidth larger than the first bandwidth of the narrow filter.

18. The apparatus of claim 16, further comprising:
second means for filtering configured to receive and filter the amplified RF signal and provide an output RF signal, the second means for filtering being for the first frequency band and having a bandwidth more narrow than the first frequency band.

19. A computer program product, comprising:
a non-transitory computer-readable medium comprising:
code for causing at least one computer to select a narrow filter configured as a passband filter to filter an input radio frequency (RF) signal and provide a filtered RF signal when a wireless device concurrently communicates with a first wireless network in a first frequency band and with a second wireless network in a second frequency band adjacent to the first frequency band, the narrow filter being for the first frequency band and having a first bandwidth more narrow than the first frequency band, the narrow filter being located prior to a power amplifier; and
code for causing the at least one computer to select a full filter to filter an amplified RF signal from the power amplifier and provide an output RF signal when the wireless device communicates with the first wireless network in the first frequency band but not with the second wireless network in the second frequency band, the full filter being for the first frequency band and having a second bandwidth larger than the first bandwidth of the narrow filter, the full filter being located after the power amplifier.

20. The apparatus of claim 1, wherein the first switch is coupled to an input of the narrow filter, and wherein the first signal path is coupled to the second signal path via the first switch and a second switch coupled to an output of the narrow filter.

21. The apparatus of claim 1, further comprising a third signal path over which the input RF signal is received, wherein the apparatus is configured to selectively couple the first signal path to the third signal path and to selectively couple the bypass signal path to the third signal path.

* * * * *